(12) United States Patent
Lee

(10) Patent No.: US 10,768,440 B2
(45) Date of Patent: Sep. 8, 2020

(54) BARRIER PANEL AND DISPLAY DEVICE INCLUDING THE SAME

(71) Applicant: LG Display Co., Ltd., Seoul (KR)

(72) Inventor: Da-Hee Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/213,589

(22) Filed: Dec. 7, 2018

(65) Prior Publication Data

US 2019/0187485 A1 Jun. 20, 2019

(30) Foreign Application Priority Data

Dec. 20, 2017 (KR) ......................... 10-2017-0175857

(51) Int. Cl.
*G02B 30/30* (2020.01)
*H04N 13/359* (2018.01)
*H04N 13/31* (2018.01)
*H04N 13/312* (2018.01)

(52) U.S. Cl.
CPC ............ *G02B 30/30* (2020.01); *H04N 13/31* (2018.05); *H04N 13/312* (2018.05); *H04N 13/359* (2018.05)

(58) Field of Classification Search
CPC .............. G02B 27/2214; G02B 30/30; G02F 1/133528; G02F 1/134309; H04N 13/359
USPC .......................................................... 349/15
See application file for complete search history.

(56) References Cited

U.S. PATENT DOCUMENTS

| | | | |
|---|---|---|---|
| 2011/0157495 A1* | 6/2011 | Kim | G02B 27/2214 349/15 |
| 2012/0001890 A1* | 1/2012 | Kook | G02B 27/2214 345/212 |
| 2013/0208195 A1* | 8/2013 | Cho | G02F 1/134309 349/15 |
| 2013/0335648 A1* | 12/2013 | Kuroda | G02F 1/13306 349/15 |
| 2014/0063383 A1* | 3/2014 | Xie | G02B 27/2228 349/15 |
| 2015/0138460 A1* | 5/2015 | Sugiyama | G02F 1/29 349/15 |
| 2016/0156903 A1* | 6/2016 | Jeong | G09G 3/3614 345/697 |
| 2019/0011717 A1* | 1/2019 | Murao | G09G 3/20 |

* cited by examiner

*Primary Examiner* — Thanh Nhan P Nguyen
(74) *Attorney, Agent, or Firm* — Birch, Stewart, Kolasch & Birch, LLP

(57) ABSTRACT

A barrier panel for a display device includes a first substrate and a second substrate facing each other with a liquid crystal layer therebetween, a plurality of first barrier electrodes that extend along a second direction on the first substrate and are operated individually, a second barrier electrode that is on the second substrate and includes a plurality of electrode patterns which are separated from each other with respect to a first direction perpendicular to the second direction, and a plurality of column spacers between the first and second substrates.

11 Claims, 7 Drawing Sheets

BARRIER PANEL AND DISPLAY DEVICE INCLUDING THE SAME

CROSS-REFERENCE TO RELATED APPLICATIONS

The present application claims the priority benefit of Korean Patent Application No. 10-2017-0175857 filed in the Republic of Korea on Dec. 20, 2017, which is hereby incorporated by reference in its entirety for all purposes as if fully set forth herein.

BACKGROUND OF THE INVENTION

Field of the Invention

The present invention relates to a barrier panel and a display device including the same.

Discussion of the Related Art

In the current information society, needs for display devices have increased dramatically. Recently, flat display devices, such as a liquid crystal display (LCD) device, a plasma display panel (PDP) device, and an organic light emitting diode (OLED) display device, are used.

Further, needs for display devices realizing 3D (three-dimensional) images have increased, and to do this, a barrier panel is attached on a display panel of a flat display device.

A liquid crystal panel is used as a barrier panel. A liquid crystal barrier panel includes a plurality of first barrier electrodes extending along a direction, for example, a vertical direction and a plurality of second barrier electrodes facing the plurality of first barrier electrodes, so as to form a barrier region to block light and a transmissive region to transmit light.

Column spacers are formed all over the barrier panel to maintain a cell gap of the barrier panel.

In the barrier panel according to the related art, an abnormal operation of liquid crystal starts from a column spacer, which is positioned at a boundary between the barrier region and the transmissive region, and is transferred along a vertical direction that is an extension direction of the first barrier electrode.

Accordingly, a vertical line defect (or raining-like defect) that a boundary along the vertical direction between the barrier region and the transmissive region is unclear (or blurred) happens, and thus a display quality of a 3D image can be reduced.

SUMMARY OF THE INVENTION

Accordingly, the present invention is directed to a barrier panel and a display device including the same that substantially obviate one or more of the problems due to limitations and disadvantages of the related art.

An object of the present invention is to provide a barrier panel and a display device that can improve a vertical line defect of the barrier panel.

Additional features and advantages of the invention will be set forth in the description which follows, and in part will be apparent from the description, or can be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a barrier panel for a display device includes a first substrate and a second substrate facing each other with a liquid crystal layer therebetween, a plurality of first barrier electrodes that extend along a second direction on the first substrate and are operated individually, a second barrier electrode that is on the second substrate and includes a plurality of electrode patterns which are separated from each other with respect to a first direction perpendicular to the second direction, and a plurality of column spacers between the first and second substrates.

In another aspect, a display device includes a barrier panel and a display panel below the barrier panel. The barrier panel includes a first substrate and a second substrate facing each other with a liquid crystal layer therebetween, a plurality of first barrier electrodes that extend along a second direction on the first substrate and are operated individually, a second barrier electrode that is on the second substrate and includes a plurality of electrode patterns which are separated from each other with respect to a first direction perpendicular to the second direction, and a plurality of column spacers between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to exemplary embodiments, examples of which are illustrated in the accompanying drawings. The same reference numbers can be used throughout the drawings to refer to the same or like parts.

Figure 1:
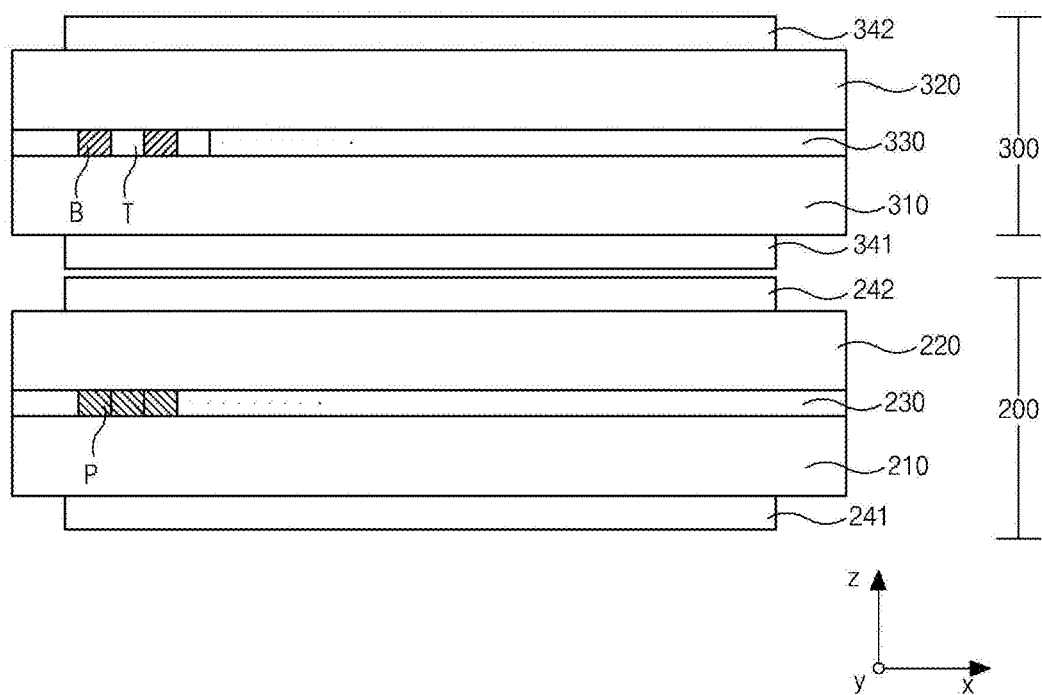
FIG. 1 is a schematic cross-sectional view illustrating a display device according to an embodiment of the present invention.

FIG. 1 is a schematic cross-sectional view illustrating a display device according to an embodiment of the present invention. All the components of the display device according to all embodiments of the present invention are operatively coupled and configured.

Referring to FIG. 1, a display device 100 can include a display panel 200 and a barrier panel 300.

For purpose of explanations, it is assumed that two side surfaces of the display device 100 that are perpendicular to each other are parallel with x-axis and y-axis, respectively, and a z-axis is normal to a plane of the display device 100, i.e., an x-y plane.

The display panel 200 is an image display panel that is supplied with image data and displays an image. Various types of display panels can be used.

For example, a liquid crystal panel, an electroluminescent panel, a plasma panel or the like can be used as the display panel 200. The electroluminescent panel can use an organic light emitting panel including an organic light emitting diode.

In this embodiment, a liquid crystal panel is used by way of example.

The display panel 200 configured with the liquid crystal panel can include a third substrate 210 and a fourth substrate 220 facing and coupled to each other, and a liquid crystal layer 230, i.e., a second liquid crystal layer 230 between the third and fourth substrates 210 and 220.

The third substrate 210 can be an array substrate. On an inner surface of the third substrate 210, a plurality of gate lines and a plurality of data lines cross each other to define a plurality of pixels P arranged in a matrix form.

Each pixel P includes a thin film transistor (TFT) connected to the corresponding gate and data lines and a pixel electrode connected to the TFT.

The fourth substrate 220 can be a color filter substrate. On an inner surface, a color filter patterned corresponding to each pixel P, and a black matrix surrounding the color filter pattern and covering non-display elements such as the gate line, the data line, the TFT and the like are formed.

All types of liquid crystal panels can be available as the liquid display pane 1200. For example, an IPS type, AH-IPS type, TN type, VA type, or ECB type liquid crystal panel can be used.

In case of the IPS type or AH-IPS type, a common electrode to produce an in-plane electric field along with the pixel electrode is formed at the third substrate 210.

Each of the third and fourth substrates 210 and 220 can include an alignment layer contacting the second liquid crystal layer 230 to align liquid crystal molecules of the second liquid crystal layer 230. A seal pattern can be formed between peripheries of the third and fourth substrates 210 and 220.

Further, a third polarization plate 241 and a fourth polarization plate 242 can be attached to outer surfaces of the third and fourth substrates 210 and 220, respectively.

The third polarization plate 241 can have a polarizing axis perpendicular to that of the fourth polarization plate 242.

A printed circuit board can be connected to at least one side of the liquid crystal panel 200 through a flexible circuit film.

When the display panel 200 is configured with the liquid crystal panel, a backlight unit is located below the display panel 200 and supplies a backlight to the liquid crystal panel 200.

The barrier panel 300 to display a 3D image can be located on a display surface as a front surface of the display panel 200.

Considering a viewing distance in displaying a 3D image, an element (e.g., gap substrate) to obtain a separate distance between the barrier panel 300 and the display panel 200 can be interposed between the barrier panel 300 and the display panel 200.

A liquid crystal barrier panel can be used as the barrier panel 300. In this case, the barrier panel 300 adjusts a light transmittance by regions using a liquid crystal so that a barrier region B (or a light-blocking region) and a transmissive region T (or a light-transmitting region) are variably produced.

Since the barrier panel 300 adjusts the transmittance, the display device 100 is capable of displaying 3D images and 2D images as well.

For example, when the display device 100 being driven in a 3D display mode, as shown in FIG. 1, the barrier panel 300 can be operated to form the barrier region B and the transmissive region T arranged alternately in the first direction (e.g., a horizontal direction) as the x-axis direction.

When the display device 100 being driven in a 2D display mode, the barrier panel 300 can be operated such that all regions of the barrier panel 300 become transparent.

The barrier panel 300 can include a first substrate 310 and a second substrate 320 facing and coupled to each other, and a liquid crystal layer 330 (i.e., a first liquid crystal layer 330) between the third and fourth substrates 210 and 220.

The barrier panel 300 can be configured with a TN (twisted nematic) type liquid crystal panel. In other words, the first liquid crystal layer 330 can be a TN liquid crystal layer.

In this case, first and second barrier electrodes can be formed on the inner surfaces of the first and second substrates 310 and 320, respectively, to operate the first liquid crystal layer 330.

Further, a first polarization plate 341 and a second polarization plate 342 can be attached to the outer surfaces of the first and second substrates 310 and 320, respectively.

The first polarization plate 341 can have a polarizing axis perpendicular to that of the second polarization plate 342.

The first polarization plate 341 can have the polarizing axis which is parallel to that of the fourth polarization plate 242 therebelow.

A structure of the barrier panel 300 is explained in more detail further with reference to FIGS. 2 to 5.

Figure 2:
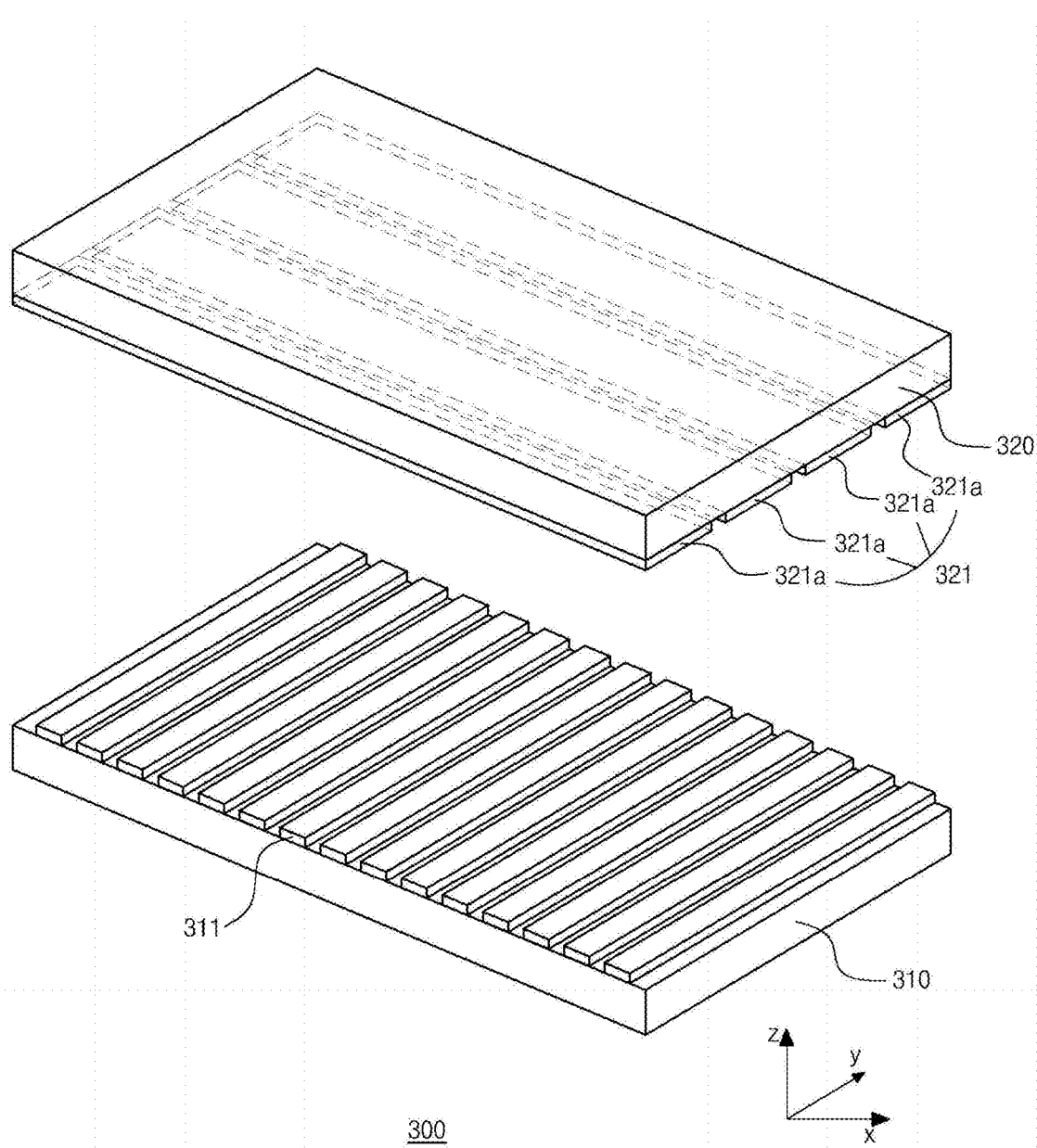
FIG. 2 is a schematic perspective view illustrating a barrier panel according to an embodiment of the present invention.
Figure 3:
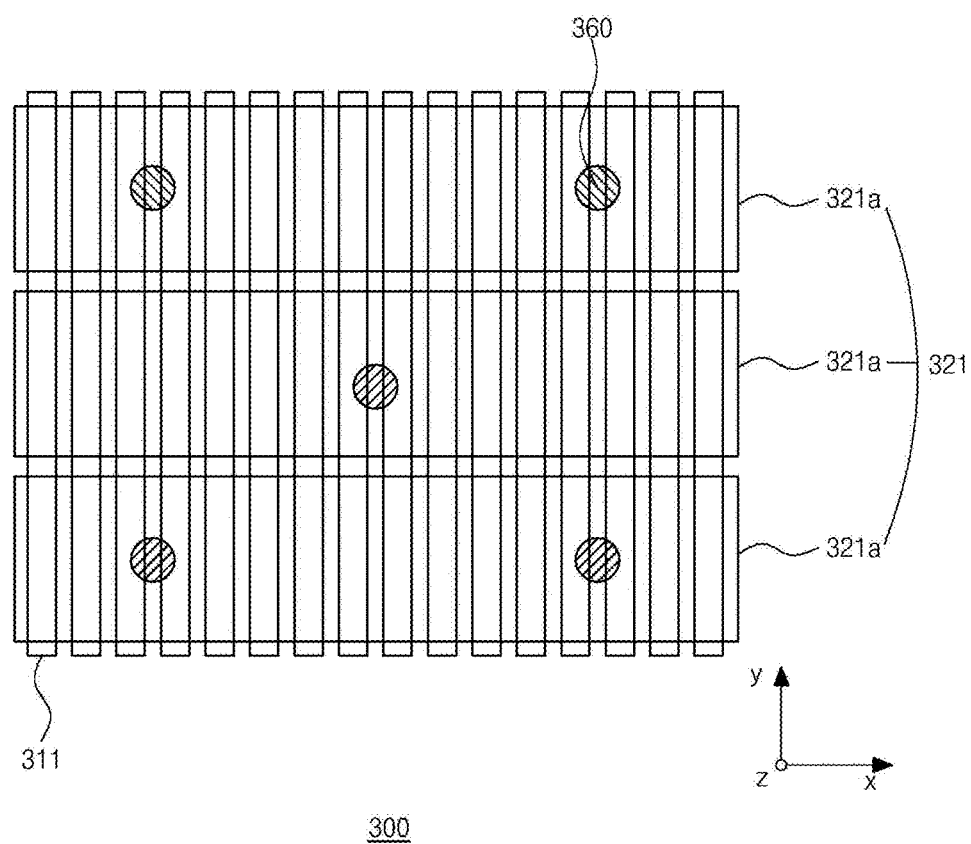
FIG. 3 is a schematic plan view illustrating a barrier panel according to an embodiment of the present invention.
Figure 4:
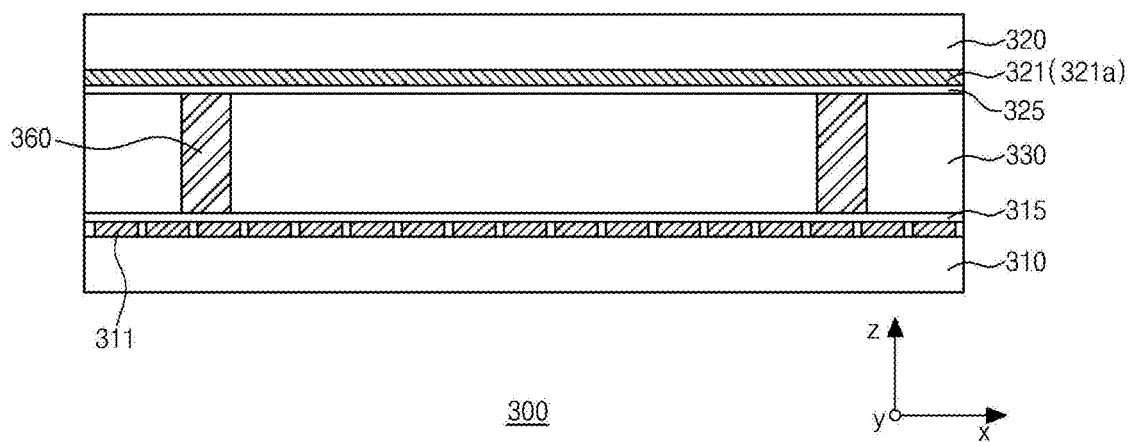
FIGS. 4 and 5 are schematic cross-sectional views illustrating a barrier panel in a first direction and a second direction, respectively, according to an embodiment of the present invention.
Figure 5:
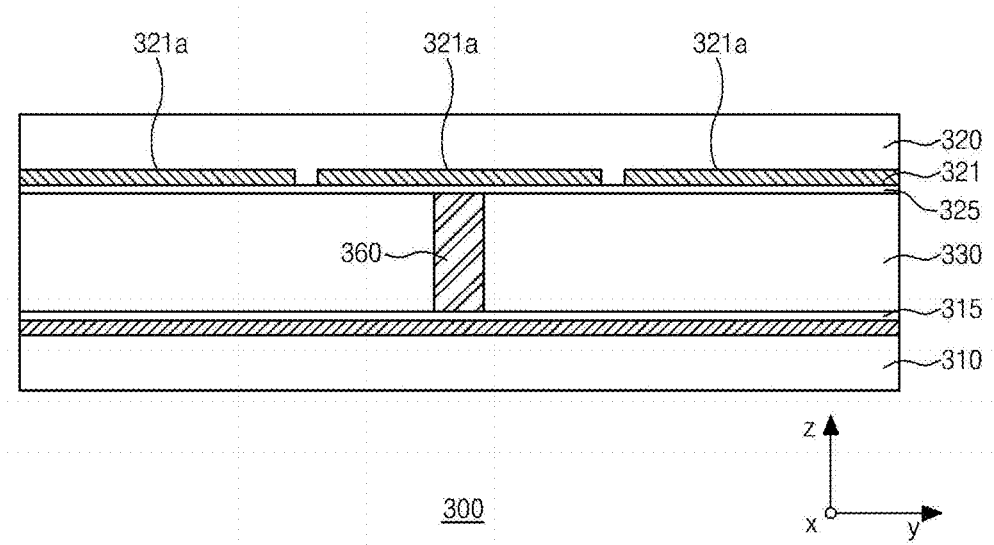

FIG. 2 is a schematic perspective view illustrating an example of the barrier panel 300 according to the present invention, FIG. 3 is a schematic plan view illustrating the barrier panel 300 of FIG. 2 according to an embodiment of the present invention, and FIGS. 4 and 5 are schematic cross-sectional views illustrating the barrier panel 300 of FIG. 2 in a first direction and a second direction, respectively, according to an embodiment of the present invention. For purpose of explanations, some parts of the barrier panel may be not shown in FIGS. 2-5.

Referring to FIGS. 2 to 5, the barrier panel 300 includes the first and second substrates 310 and 320 with the first liquid crystal layer 330 therebetween.

On an inner surface of one of the first and second substrates 310 and 320, for example, on an inner surface of the first substrate 310 as a lower substrate, a plurality of first barrier electrodes 311 can be formed such that the first barrier electrodes 311 extend in parallel along a second direction (e.g., a vertical direction) as the y-axis direction.

In other words, the first barrier electrodes 311 are spaced apart from each other in the first direction perpendicular to the second direction.

The first barrier electrode 311 can be formed of a transparent conductive material, for example, ITO, IZO or the like.

The plurality of first barrier electrodes 311 can be supplied with respective driving voltages, and be operated individually (or independently) from each other.

A first alignment layer 315 can be formed on the first barrier electrodes 311 to align liquid crystal molecules of the first liquid crystal layer 330.

A second barrier electrode 321 can be formed on an inner surface of the second substrate 320 and can face the plurality of first barrier electrodes 311.

The second barrier electrode 321 can be formed of a transparent conductive material, for example, ITO, IZO or the like.

The second barrier electrode 321 can serve as a common electrode and can be supplied with a common voltage as a driving voltage.

In this embodiment, the second barrier electrode 321 can be configured to be partitioned (or divided) into a plurality of electrode patterns (or partitioned electrode patterns) 321a.

In this regard, the second barrier electrode 321 can be formed with the electrode patterns 321a that extend in parallel along the first direction perpendicular to the second direction of the extension direction of the first barrier electrode 311.

In other words, each electrode pattern 321a can extend along the first direction such that it traverses all of the first barrier electrodes 311.

The plurality of electrode patterns 321a are spaced apart from each other in the second direction as the y-axis direction.

The plurality of electrode patterns 321a can be simultaneously supplied with the same driving voltage, i.e., the common voltage.

As such, the second barrier electrode 321 can be configured with the plurality of electrode patterns 321a which extend along the direction perpendicular to the extension direction of the first barrier electrode 311 and are spaced apart from each other.

A second alignment layer 325 can be formed on the second barrier electrode 321 to align the liquid crystal molecules of the first liquid crystal layer 330.

Since the first liquid crystal layer 330 is a TN liquid crystal layer, the first alignment layer 315 can have an alignment direction perpendicular to that of the second alignment layer 325.

To maintain a cell gap between the first and second substrates 310 and 320, a plurality of column spacers 360 can be arranged in the first liquid crystal layer 330 between the first and second substrates 310 and 320.

The column spacers 360 can be distributed all over the substrates 310 and 320 of barrier panel 300 so that the cell gap of the barrier panel 300 is maintained uniformly.

In another embodiment, the barrier panel 300 can have an arrangement that is the reverse of the above-described arrangement of the first and second barrier electrodes 311 and 321. In this regard, the second barrier electrode 321 of the partition structure operated with the common voltage can be arranged at the first substrate 310, and the first barrier electrodes 311 in a stripe shape operated individually can be arranged at the second substrate 320.

Figure 6:
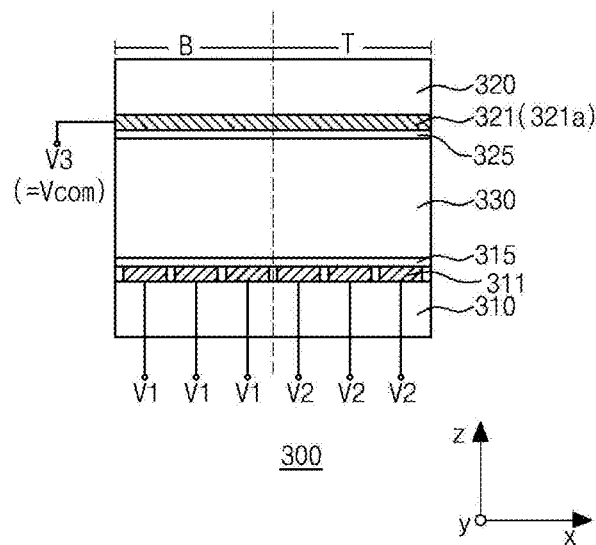
FIG. 6 is a view illustrating producing a barrier region in a barrier panel according to an embodiment of the present invention.

The barrier panel 300 is operated to produce the barrier region B in the 3D display mode, which is explained further with reference to FIG. 6.

FIG. 6 is a view illustrating producing a barrier region in a barrier panel according to an embodiment of the present invention.

For purpose of explanations, the barrier panel 300 is a normally white type liquid crystal barrier panel by way of example. The normally white type liquid crystal barrier panel is operated such that it transmits a light at an initial state and when an electric field is not applied, and it blocks a light when an electric field is applied.

Alternatively, a normally black type liquid crystal barrier panel, which is the reverse of the normally white type liquid crystal barrier panel, can be used. The normally black type liquid crystal barrier panel is operated such that it blocks a light when an electric field is not applied, and it transmits a light when an electric field is applied.

Referring to FIG. 6, when the display device 100 is driven in the 3D display mode, the barrier panel 300 is operated such that the barrier regions B and the transmissive regions T are formed to realize a 3D display mode.

In this regard, at least one first barrier electrode 311, which is located corresponding to the barrier region B, can each be supplied with a first driving voltage V1.

The first driving voltage V1 is different from a third driving voltage V3 applied to the second barrier electrode 321.

Further, at least one first barrier electrode 311, which is located corresponding to the transmissive region T, can each be supplied with a second driving voltage V2.

The second driving voltage V2 is equal to the third driving voltage V3 applied to the second barrier electrode 321. Alternatively, the first barrier electrode 311 belonging to the transmissive region T can be applied with no voltage.

The second barrier electrode 321 as a common electrode can be supplied with the third driving voltage V3 as a common voltage Vcom. In detail, the plurality of electrode patterns 321a constituting the second barrier electrode 321 can all be supplied with the third driving voltage V3, i.e., the common voltage Vcom.

In this case, at the region where the first barrier electrode 311 supplied with the first driving voltage V1 is located, an electric field between the first barrier electrode 311 and the second barrier electrode 321 is produced.

Accordingly, liquid crystal molecules in this region change in the arrangement direction due to an electric field produced by a difference between the first and third driving voltages V1 and V3, and thus an output of light is shut.

Such a region where the first barrier electrode 311 applied with the first driving voltage V1 is located serves as the barrier region B.

At a region where the first barrier electrode 311 applied with the second driving voltage V2 is located, an electric field between the first barrier electrode 311 and the second barrier electrode 321 is not produced.

Accordingly, liquid crystal molecules in this region do not change in the arrangement direction, and thus an output of light is made.

Such a region where the first barrier electrode 311 applied with the second driving voltage V2 is located serves as the transmissive region T.

As described above, by adjusting a driving voltage applied to the first barrier electrode 311, the barrier region B can be formed in the barrier panel 300.

In this embodiment, the second barrier electrode 321 as the common electrode is configured with a structure that is partitioned with respect to a direction perpendicular to the extension direction of the first electrode 311.

Since the second barrier electrode 321 is configured with the partitioned structure, a liquid crystal operating region, which is a region where an electric field to operate a liquid crystal is produced, is also configured with a structure, which is partitioned with respect to a direction perpendicular to the extension direction of the first electrode 311, in accordance with the partitioned structure of the second barrier electrode 321.

In this regard, since the first barrier electrodes 311 are operated individually in the barrier panel 300 to produce the barrier regions B and the transmissive regions T, a liquid crystal operating region of the barrier panel 300 is substantially defined along the second direction, i.e., the vertical direction that is the extension direction of the first barrier electrode 311.

In this embodiment, the second barrier electrode 321 is configured with the partitioned (or divided) structure with respect to the first direction (e.g., the horizontal direction) perpendicular to the second direction that is the extension direction of the first barrier electrode 311.

Accordingly, the liquid crystal operating region in a form of extending along the vertical direction is partitioned (or divided) at the partitioning positions of the second barrier electrode 321 so that the liquid crystal operating region substantially has a partitioned structure in the first direction like the second barrier electrode 321.

In other words, in accordance with the partitioned structure of the second barrier electrode 321, the liquid crystal operating region is configured with a plurality of partial operating regions that are split (or separated) from each other with respect to the horizontal direction.

As such, the liquid crystal operating region is partitioned. Thus, even though one of the partial operating regions is abnormally operated and has liquid crystal molecules aligned abnormally, this abnormal operation being transferred to a neighboring partial operating region can be prevented.

Accordingly, a vertical line defect (or raining-like defect) that the abnormal operation of liquid crystal starting from the column spacer 360 is transferred along the extension direction of the first barrier electrode 311 can be improved (or reduced).

This is explained further with reference to FIGS. 7 to 9B.

Figure 7:
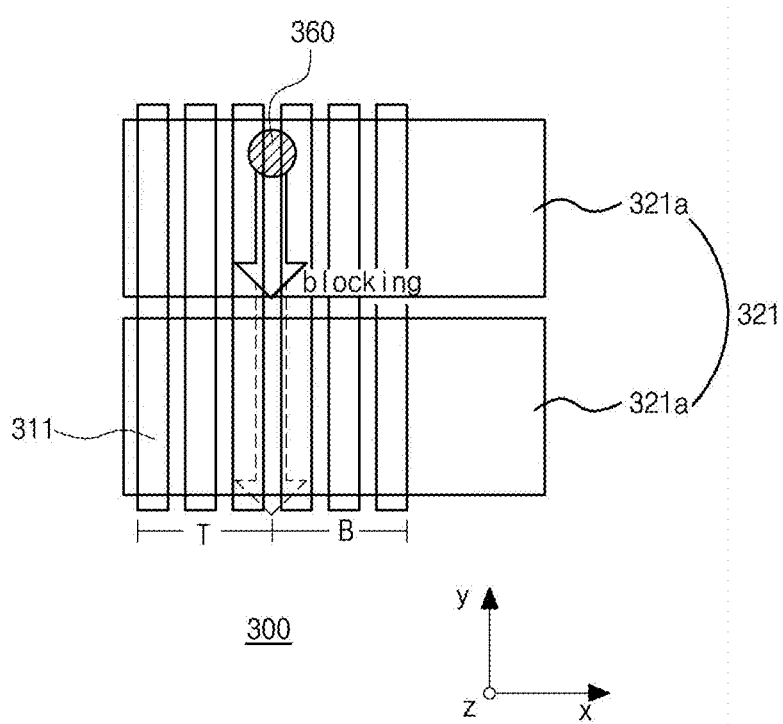
FIG. 7 is a view illustrating improving a vertical line defect in a barrier panel according to an embodiment of the present invention.
Figure 8:
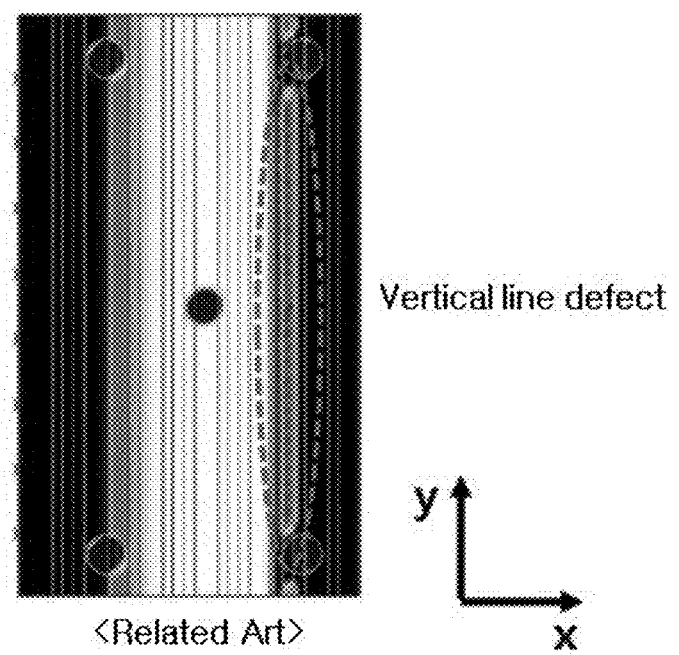
FIG. 8 is a view illustrating a simulation result that a vertical line defect happens when using a barrier panel according to the related art.
Figure 9A:
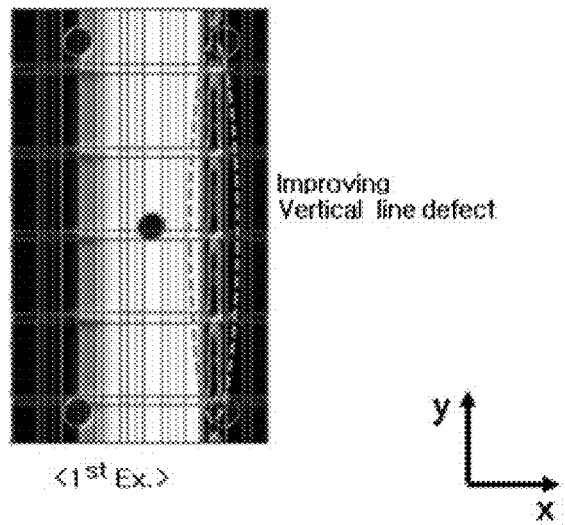
FIGS. 9A and 9B are views illustrating simulation results that a vertical line defect is improved when using a barrier panel respectively according to an embodiment of the present invention.
Figure 9B:
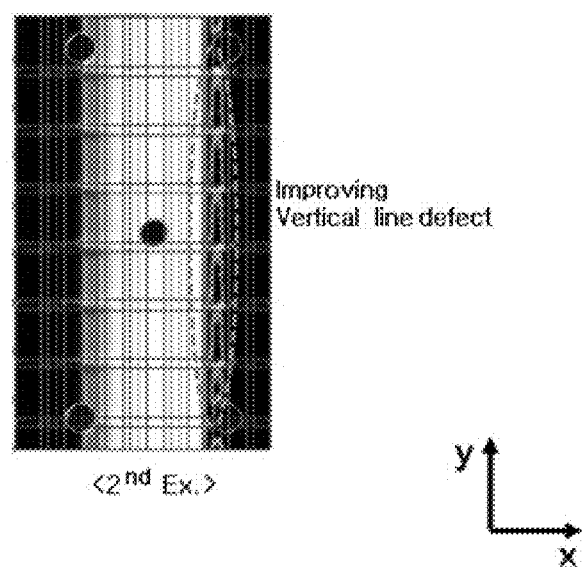

FIG. 7 is a view illustrating improving a vertical line defect in a barrier panel according to an embodiment of the present invention. FIG. 8 is a view illustrating a simulation result that a vertical line defect happens when using a barrier panel according to the related art. FIGS. 9A and 9B are views illustrating simulation results that a vertical line defect is improved when using a barrier panel respectively according to an embodiment of the present invention.

Referring to FIG. 7, a regulatory power of an alignment layer is weak around a column spacer 360, and thus the liquid crystal molecules can be aligned abnormally and a liquid crystal can be abnormally operated.

When the abnormal operation of the liquid crystal around the column spacer 360 happens, the abnormal operation starting from the column spacer 360 is transferred along the first barrier electrode 311 extending in the vertical direction.

In the related art in which the second barrier electrode is formed in a single body all over a substrate, the abnormal operation of the liquid crystal is continuously transferred along the first barrier electrode (see a dashed-line arrow of FIG. 7).

Accordingly, as shown in FIG. 8, a vertical line defect that a boundary along a vertical direction between the barrier region B and the transmissive region T is unclear (or blurred) happens, and thus a display quality of a 3D image is reduced.

In this embodiment in which the second barrier electrode 321 is configured with the partitioned structure with respect to the horizontal direction, the abnormal operation of the liquid crystal is blocked (or shut) at the separate region between the neighboring electrode patterns 321a that is the partitioning region in the second barrier electrode 321 (see a solid-line arrow of FIG. 7).

Accordingly, as shown in FIGS. 9A and 9B, a vertical line defect can be improved (or reduced), and thus a display quality of a 3D image can be improved (or increased).

A case where the electrode patterns 321a have a relatively greater width is illustrated as a first example in FIG. 9A, and a case where the electrode patterns 321a have a relatively less width is illustrated as a second example in FIG. 9B.

The second example of the less width is better in blocking the abnormal operation that the first example of the electrode patterns 321a of the greater width.

Further, the first example has a number of partitioned regions less than the second example, and thus the first example can have a more uniform operation property of liquid crystal.

The first example has the partitioned structure in which the electrode patterns 321a separated at a first pitch, and in this case, an interval (or separation distance) between the neighboring electrode patterns 321a is "a" and a width (i.e., a width in the vertical direction) of the electrode pattern 321a is "b". The second example has the partitioned structure in which the electrode patterns 321a separated at a second pitch less than the first pitch, and in this case, an interval between the neighboring electrode patterns 321a is "a" and a width (i.e., a width in the vertical direction) of the electrode pattern 321a is "c" less than "b". The references "a", "b" and "c" are not shown in the drawings.

Based on the simulation results of the first and second examples, it is preferable, but not limited, that a ratio of the interval and the width of the electrode pattern 321a is 1:(5~7.25). That is, this ratio can range from 1:5 to 1:7.25.

As described above, in the embodiment of the present invention, the second barrier electrode is configured to be partitioned with respect to the direction perpendicular to the extension direction of the first barrier electrodes that are operated individually.

Therefore, the vertical line defect that the abnormal operation of the liquid crystal starting from the column spacer is transferred along the first barrier electrode can be improved, and thus a display quality of a 3D image can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A barrier panel for a display device, the barrier panel comprising:
   a first substrate and a second substrate facing each other with a liquid crystal layer therebetween;
   a plurality of first barrier electrodes that extend along a second direction on the first substrate and are operated individually;

a second barrier electrode that is on the second substrate and includes a plurality of electrode patterns which are separated from each other with respect to the second direction perpendicular to a first direction; and a plurality of column spacers between the first and second substrates, wherein the plurality of electrode patterns are supplied with a common voltage, wherein a ratio of an interval between two neighboring electrode patterns of the plurality of electrode patterns and a width of each of the plurality of electrode patterns ranges from 1:5 to 1:7.25, and wherein each of the plurality of column spacers is disposed to overlap both of immediately adjacent first barrier electrodes from among the plurality of first barrier electrodes.

2. The barrier panel of claim 1, Wherein the liquid crystal layer is a twisted nematic (TN) liquid crystal layer.

3. The barrier panel of claim 2, wherein a first polarizing plate and a second polarizing plate are respectively located on outer surfaces of the first substrate and the second substrate, and have respective polarizing axes perpendicular to each other.

4. The barrier panel of claim 1, wherein the width of each of the plurality of electrode patterns in the second direction is greater than a width of each of the plurality of first barrier electrodes in the first direction.

5. The barrier panel of claim 1, wherein a line defect caused by an abnormal operation of a liquid crystal of the liquid crystal layer starting from a column spacer of the plurality of column spacers is blocked at a separate region between neighboring electrode patterns of the plurality of electrode patterns.

6. A display device comprising:
a barrier panel; and
a display panel below the barrier panel,
wherein the barrier panel includes:
a first substrate and a second substrate facing each other with a liquid crystal layer therebetween;
a plurality of first barrier electrodes that extend along a second direction on the first substrate and are operated individually;
a second barrier electrode that is on the second substrate and includes a plurality of electrode patterns which are separated from each other with respect to the second direction perpendicular to a first direction; and
a plurality of column spacers between the first and second substrates,
wherein the plurality of electrode patterns are supplied with a common voltage,
wherein a ratio of an interval between two neighboring electrode patterns of the plurality of electrode patterns and a width of each of the plurality of electrode patterns ranges from 1:5 to 1:7.25, and
wherein each of the plurality of column spacers is disposed to overlap both of immediately adjacent first barrier electrodes from among the plurality of first barrier electrodes.

7. The display device of claim 6, wherein the liquid crystal layer is a twisted nematic (TN) liquid crystal layer.

8. The display device of claim 7, wherein a first polarizing plate and a second polarizing plate are respectively located on outer surfaces of the first substrate and the second substrate, and have respective polarizing axes perpendicular to each other.

9. The display device of claim 6, wherein the display panel is a liquid crystal panel or an electroluminescent panel.

10. The display device of claim 6, wherein the width of each of the plurality of electrode patterns in the second direction is greater than a width of each of the plurality of first barrier electrodes in the first direction.

11. The display device of claim 6, wherein a line defect caused by an abnormal operation of a liquid crystal of the liquid crystal layer starting from a column spacer of the plurality of column spacers is blocked at a separate region between neighboring electrode patterns of the plurality of electrode patterns.

* * * * *